(12) United States Patent
Ho

(10) Patent No.: US 12,126,607 B2
(45) Date of Patent: *Oct. 22, 2024

(54) HIDDEN LINE PROPERTY OF ONLINE CONTENT TO INHIBIT BOT ACTIVITY

(71) Applicant: Shopify Inc., Ottawa (CA)

(72) Inventor: Dennis Ho, Rockcliffe (CA)

(73) Assignee: Shopify Inc., Ottawa (CA)

( * ) Notice: Subject to any disclaimer, the term of this patent is extended or adjusted under 35 U.S.C. 154(b) by 81 days.

This patent is subject to a terminal disclaimer.

(21) Appl. No.: 18/309,654

(22) Filed: Apr. 28, 2023

(65) Prior Publication Data

US 2023/0262043 A1   Aug. 17, 2023

Related U.S. Application Data

(63) Continuation of application No. 17/127,799, filed on Dec. 18, 2020, now Pat. No. 11,677,735.

(51) Int. Cl.
*H04L 29/06* (2006.01)
*H04L 9/40* (2022.01)

(52) U.S. Cl.
CPC .............. *H04L 63/08* (2013.01); *H04L 63/10* (2013.01); *H04L 2463/144* (2013.01)

(58) Field of Classification Search
CPC ....... H04L 63/08; H04L 63/10; H04L 63/145; H04L 63/108; G06F 21/6227; G06F 21/725
USPC ............................................................ 726/3
See application file for complete search history.

(56) References Cited

U.S. PATENT DOCUMENTS

| | | | |
|---|---|---|---|
| 7,308,581 B1* | 12/2007 | Geosimonian | G06F 21/34 713/184 |
| 7,958,363 B2* | 6/2011 | Marlow | H04L 63/12 726/28 |
| 2017/0161490 A1 | 6/2017 | Fedor | |

FOREIGN PATENT DOCUMENTS

WO    WO-2010/055159 A2    5/2010

OTHER PUBLICATIONS

First Examiner's Requisition on CA App. 3,137,564 dated Sep. 8, 2023 (5 pages).

(Continued)

*Primary Examiner* — Longbit Chai
(74) *Attorney, Agent, or Firm* — Foley & Lardner LLP

(57) ABSTRACT

Disclosed are systems and methods that require/force bots to access and interact with webpages at a similar level to humans, by including an executable script that generates/updates a test value for a webpage. The client devices must perform certain processing and/or rendering of the webpage to call the computations necessary for generating the updated test value. The script must be executed as a function of processing and/or rendering the webpage. The script may be retrieved from the webserver as a function of processing and/or rendering the webpage. When the browser executes this script, the browser generates the updated test value. At some point, the client device submits a request for certain process with the updated test value. The server compares the inbound test value from the client device against an initial/previously received test value or an expected test value to determine whether the browser is being operated by a human.

19 Claims, 6 Drawing Sheets

(56) References Cited

OTHER PUBLICATIONS

Examiner's Report dated May 15, 2024 on CA App. 3,137,564 (7 pages).
Non-Final Office Action on U.S. Appl. No. 17/127,799 DTD Oct. 6, 2022.
Notice of Allowance on U.S. Appl. No. 17/127,799 DTD Feb. 1, 2023.

* cited by examiner

HIDDEN LINE PROPERTY OF ONLINE CONTENT TO INHIBIT BOT ACTIVITY

CROSS-REFERENCE TO RELATED APPLICATION

This application is a continuation application of U.S. application Ser. No. 17/127,799, filed Dec. 18, 2020, which is incorporated by reference in its entirety.

TECHNICAL FIELD

This application relates generally to information security and, more particularly, to access control, and more particularly to inhibiting bot activity interacting with websites.

BACKGROUND

Websites targeted by bot activity (e.g., ecommerce sites, social media sites) typically include interactive graphical user interface (GUI) forms or other GUI elements that receive user information or selections. A common example is a web-form element that provides users with one or more text-input fields, such as an order form or a comment box.

Bots often use application programmable interfaces (APIs) to access a webpage and interact directly with elements and attributes of the webpage (e.g., order form). This API-level access allows the bots to submit data directly to the form, bypassing the instructions that render the webpage elements on a GUI, thereby decreasing the overall time needed to submit data to the webserver and process the desired transaction (e.g., submit order form and information, post media).

BRIEF DESCRIPTION OF THE DRAWINGS

The accompanying drawings constitute a part of this specification and illustrate embodiments of the subject matter disclosed herein.

DETAILED DESCRIPTION

Figure 1:
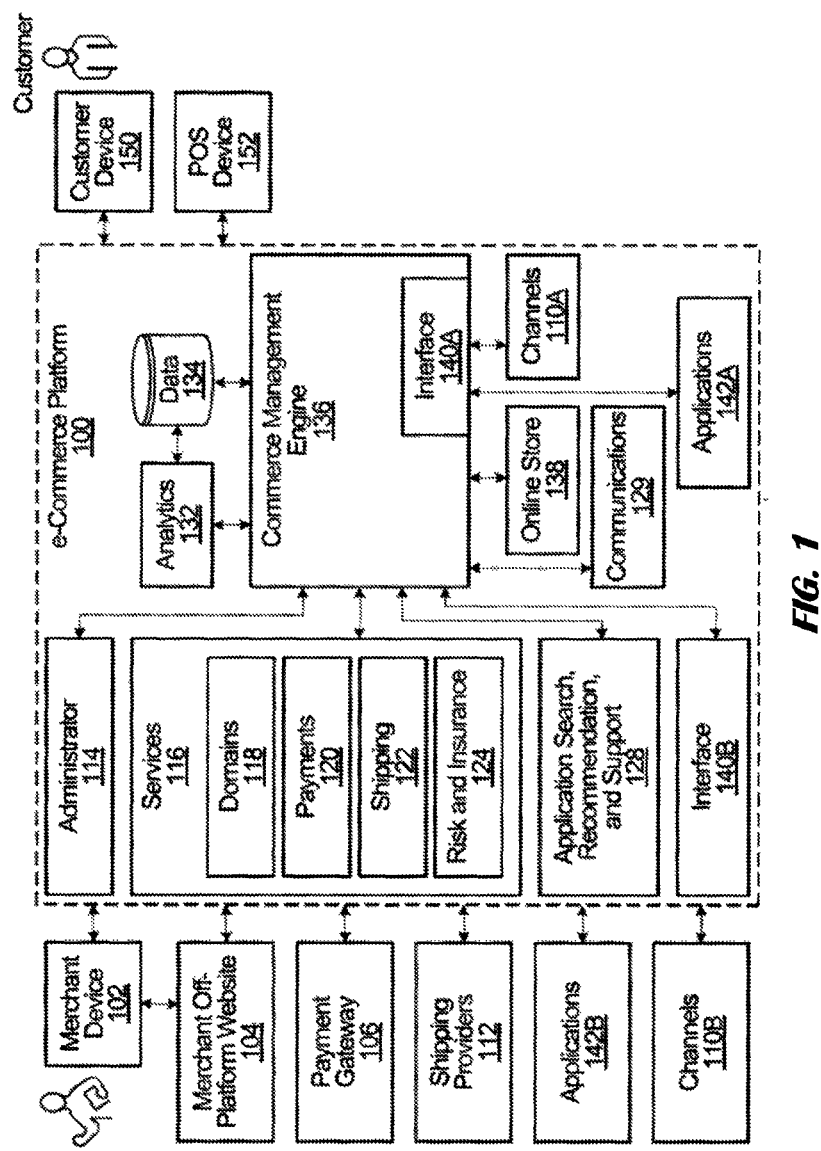
FIG. 1 illustrates an ecommerce platform, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

It is desirable to remove shortcuts for bots and require/ force bots to access and interact with webpages (e.g., at a similar level to humans), thereby increasing the overall transactional costs (e.g., time or computing resources) for bots to operate. The systems and methods described herein attempt to require processing and/or rendering of a webpage or performing other computations so that a bot cannot circumvent these requirements using an API.

A bot can parse the various types of code (e.g., HTML tags, JavaScript) of a webpage to identify GUI features, elements of the webpage, and attributes of the elements, thereby allowing the bot or the bot developer to learn and circumvent the anticipated inputs and JavaScript actions without rendering the GUI features. In some circumstances, the bot would only need a JavaScript engine to interact with the webpage and forgo a browser altogether. Consequently, simply including JavaScript commands on the webpage is insufficient to force rendering. Instead, pointers to requisite JavaScript operations could be embedded into code for various features or components of the webpage (e.g., attributes of the hidden/visible HTML features). If a browser does not actually process or render the HTML feature (as with the bot), then the embedded call to the JavaScript operation is never recognized. The browser of the client device parses and processes code of various types underlying hidden and/or visible features of the webpage, before the browser can recognize and execute the requisite JavaScript operations. In an embodiment, the webpage contains JavaScript that must be executed as a function of processing and/or rendering the webpage. The browser may retrieve the JavaScript code from a server as a function of processing and/or rendering the webpage. When the browser executes this JavaScript code, the browser generates a test value.

A bot interacts with an input field of a webpage by directly submitting expected values. During development or updating/retraining processes, the bot's developer or the bot itself identifies the expected values or types of values and then adds these expected inputs to the bot's operating rules. During deployment, the bot directly submits the expected inputs to the input field via an API (or other scripting technique) without processing and/or rendering the hidden and visible features (e.g., text boxes) intended to capture the expected inputs from a client-side browser. Unlike the bot, a human user must wait for the browser to render the GUI features and then manually interact with the GUI features to submit the expected inputs. Requiring the bot to actually process and render most or all of the webpage (including the GUI features) would slow the bot's operations to a pace more comparable to the human. Moreover, the additional client-side processing requirements to process and/or render the GUI feature would greatly increase demands on the bot owner's computing resources. The webpage could include multiple instances of calls to the script for updating the test value, such that further processing and/or rendering of certain features forces the client device to perform additional computations. This becomes a very heavy and demanding process for the bots to perform, particularly when compared to the conventional API calls employed by the bots.

To enforce GUI rendering or other computation processes, the webserver confirms whether a test value hidden within the attributes of the form (or any other element) matches an updated test value submitted with the expected inputs. The attributes of the form include an initial or default value attribute (e.g., "name") and the test value attribute, which contains a call to a JavaScript operation (or other type of scripting code) that computes the test value. The value is determined as a side-effect of the rendering of the form on the GUI (or, more broadly, of some portion of the webpage).

In operation, the client device requests the webpage from the webserver and receives the markup language (e.g., HTML) and scripting language (e.g., JavaScript). While rendering the GUI features of the webpage, the browser is prompted to execute the JavaScript operation within the attributes of the form, thereby generating the new test value that replaces the initial value. When the client-device submits the form through a second request (e.g., attempts to checkout and complete purchase), the webserver determines whether the test value matches an expected value stored in-memory at the webserver. This embodiment has the client-side device prompting and executing the JavaScript operation, though the client device or the webserver can perform the computation operation.

In a configuration, when the browser submits a request for a line item object or other component of the webpage to be associated with the browser session (e.g., adding a product to a cart), the browser calls a JavaScript operation according to an attribute of the line item or other component of the webpage. The JavaScript prompts the browser or the webserver compute a new test value for another attribute of that line item object. The calculated test value of the line item is then stored in memory. When the browser renders the form, the browser is prompted to execute a JavaScript operation that fetches the new test value of the line item. The webserver then compares the test values of the line item and the form when the webserver receives another request from the browser.

For example, when the user adds a product to a cart (e.g., line item object), the browser or the webserver runs a script that calculates a test value for the product. At checkout time, the browser requests a checkout transaction page containing a purchase form. While rendering the purchase form, the browser is prompted to update the new test value of the corresponding attribute of the form. When the user submits the purchase form to complete the transaction, the webserver receives the request and compares the test values. If a bot were attempting to checkout without rendering the form, the bot would not be able to provide the new test value for the product or fail to update the corresponding test value for the purchase form.

The webserver can evaluate the inbound test value (from the browser) against a previous iteration of the test value (e.g., initial test value) or against an expected test value (e.g., generated in parallel by the webserver; stored in memory). The webserver may perform any number of remedial steps when detecting a bot, due to an improper inbound test value. The inbound test value is improper if inbound test value matches a previous iteration or does not match an expected test value. Non-limiting examples of remedial actions include removing the line object from the browser session (e.g., emptying the cart), ending a session with the client device and preventing further access to the webpage or website, requiring additional pages of information, requiring additional operations that increases computational demands or delays on the browser (e.g, captchas®, timeouts, deprioritizing request), capturing information about the source of the bot (e.g., IP address, MAC address), and sending an email to an administrative user, among others.

In a configuration, the test value can be associated with a browser session, where the test value is dynamically updated as the user navigates the webpages of the website. Each page could include a hidden element (or other type of element) with a call to the JavaScript instructing the browser to calculate and provide an updated test value. As the client device traverses the website (e.g., requests a next webpage) or interacts with various line item objects (e.g., adds products to the cart), the JavaScript operation calculates the updated test value using the extant or previously calculated test value as an input. This session-persistent configuration could be similarly applied to calculating successive test values for line item objects, whereby the browser calculates the updated test value for each new line item object added to the session and the ultimate test value attribute fetched by the form would be the algorithmic result of the test value calculated for each of the line item objects.

As a result, even if the bot or the bot developer could determine or predict each of the individual calculated test values, the processing demands on the bot to iteratively generate the test value would likely exceed or at least limit any benefits of deploying the bot as compared to simply employing a human to navigate the website as intended.

Although the illustrative embodiments evaluate a form (e.g., online purchase form) submitted with a line item object (e.g., product in a cart) to determine whether to permit the transaction, embodiments are not limited to ecommerce. The solution can be applied in most circumstances where a webserver can mitigate bot activity by obligating the client device to perform client-side operations. For instance, social networks publish external-facing APIs that bots exploit. The social network could embed a hidden attribute in one or more GUI features of an account "Home" page that requires the client to calculate a test value. Each webpage of the social networking site could include a JavaScript requiring the browser to update the test value, as the client traverses the social network site. When the user attempts to upload a post, the webserver provides the user a posting text box (e.g., submitting a form element) with an attribute value instructing the client browser to calculate the new test value. If the new test value does not match the persistent, expected test value in the webserver memory, then the webserver has detected a bot and prohibits, delays, or otherwise impedes the post.

Additionally or alternatively, a post or comment could be a line item object. When the user elects to upload the new post, scripting instructions embedded within the GUI features prompt the browser to calculate the test value for that post (similar to calculating the test value when adding a product to a cart). The webserver then presents the posting text box (e.g., form element) having an attribute prompting the browser to calculate and/or fetch the test value of the post (e.g., line item object). When the user selects a submission command (e.g., post/submit button of the GUI), the webserver evaluates whether the test value of the post (e.g. line item object) matches the test value of the posting text box (e.g., form element). If there is no match, then the webserver has detected a bot and prohibits the post.

The client-side calculations and requisite GUI rendering slows the bot's operation temporally, but the calculations and rendering requirements also place heavy computational demands on client-side resources. This limits the scaling benefits of the bot. The bot might attempt many interactions across many webpages in a short timeframe. In addition, the bot's developer often has a number of servers executing many instances of several bots. Each additional client-side operation that each bot executes produces exponentially higher computational demands on the developer's servers.

In a configuration, to leverage this exponential growth, the webpage includes multiple attributes that prompt JavaScript operations to be executed by the browser. The multiple attributes are embedded within the elements of multiple GUI features, thereby forcing the client device to perform multiple browser calculations and render multiple GUI features.

The client-side calculations can include any number of operations performed by the browser and indicate the browser has rendered the GUI features. The client-side calculations may be as simple as generating or incrementing a value in a defined fashion involving multiple computations, but the calculations could also employ more complex algorithms (e.g., hash algorithms, such as cryptographic hash algorithms like, for example, SHA-256) that, for example, require comparatively more clock cycles, maintain privacy over certain information, and/or obfuscate the test values to inhibit reverse engineering. Such operations may be performed more than once and/or in combination such as, for example, requiring a device to perform multiple iterative computations (e.g., to identify a value that hashes to a defined hash value). Other examples of client-side operations include running the processor for a certain number of clock cycles/time at a certain rate, updating a blockchain, querying and applying an encryption certificate, or performing proof-of-work operations.

Illustrative Commerce Platform

In some embodiments, the methods disclosed herein may be performed on or in association with a commerce platform, such as an ecommerce platform. Therefore, an example of a commerce platform will be described by way of introduction.

FIG. 1 illustrates an ecommerce platform 100, according to one embodiment. The ecommerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the ecommerce platform 100 should be understood to more generally support users in an ecommerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the ecommerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The ecommerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the ecommerce platform 100. Merchants may utilize the ecommerce platform 100 for managing commerce with customers, such as by implementing an ecommerce experience with customers through an online store 138, through channels 110A-B, through POS devices 152 in physical locations (e.g., a physical storefront or other location such as through a kiosk, terminal, reader, printer, 3D printer, and the like), by managing their business through the ecommerce platform 100, and by interacting with customers through a communications facility 129 of the ecommerce platform 100, or any combination thereof. A merchant may utilize the ecommerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the ecommerce platform), and the like. However, even these 'other' merchant commerce facilities may be incorporated into the ecommerce platform, such as where POS devices 152 in a physical store of a merchant are linked into the ecommerce platform 100, where a merchant off-platform website 104 is tied into the ecommerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the ecommerce platform 100, where channels 110A may be provided internal to the ecommerce platform 100 or from outside the ecommerce channel 110B. A merchant may sell in their physical retail store, at pop ups, through wholesale, over the phone, and the like, and then manage their sales through the ecommerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online ecommerce offering presence through the ecommerce platform 100, where an online store 138 may refer to the multitenant collection of storefronts supported by the ecommerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The ecommerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the ecommerce platform 100 may be implemented through a processing facility including a processor and a memory, the processing facility storing a set of instructions that, when executed, cause the ecommerce platform 100 to perform the ecommerce and support functions as described herein. The processing facility may be part of a server, client, network infrastructure, mobile computing platform, cloud computing platform, stationary computing platform, or other computing platform, and provide electronic connectivity and communications between and amongst the electronic components of the ecommerce platform 100, merchant devices 102, payment gateways 106, application developers, channels 110A-B, shipping providers 112, customer devices 150, point of sale devices 152, and the like. The ecommerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the ecommerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the ecommerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the ecommerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the ecommerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the ecommerce platform 100, such as for storage by the system (e.g., as data 134). In some embodiments, the ecommerce platform 100 may provide functions for resizing images, associating an image with a product, adding and associating text with an image, adding an image for a new product variant, protecting images, and the like.

As described herein, the ecommerce platform 100 may provide merchants with transactional facilities for products through a number of different channels 110A-B, including the online store 138, over the telephone, as well as through physical POS devices 152 as described herein. The ecommerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the ecommerce platform 100 or in association with external facilities, such as through a payment gateway 106 for payment processing, shipping providers 112 for expediting the shipment of products, and the like.

In some embodiments, the ecommerce platform 100 may provide for integrated shipping services 122 (e.g., through an ecommerce platform shipping facility or through a third-party shipping carrier), such as providing merchants with real-time updates, tracking, automatic rate calculation, bulk order preparation, label printing, and the like.

Figure 2:
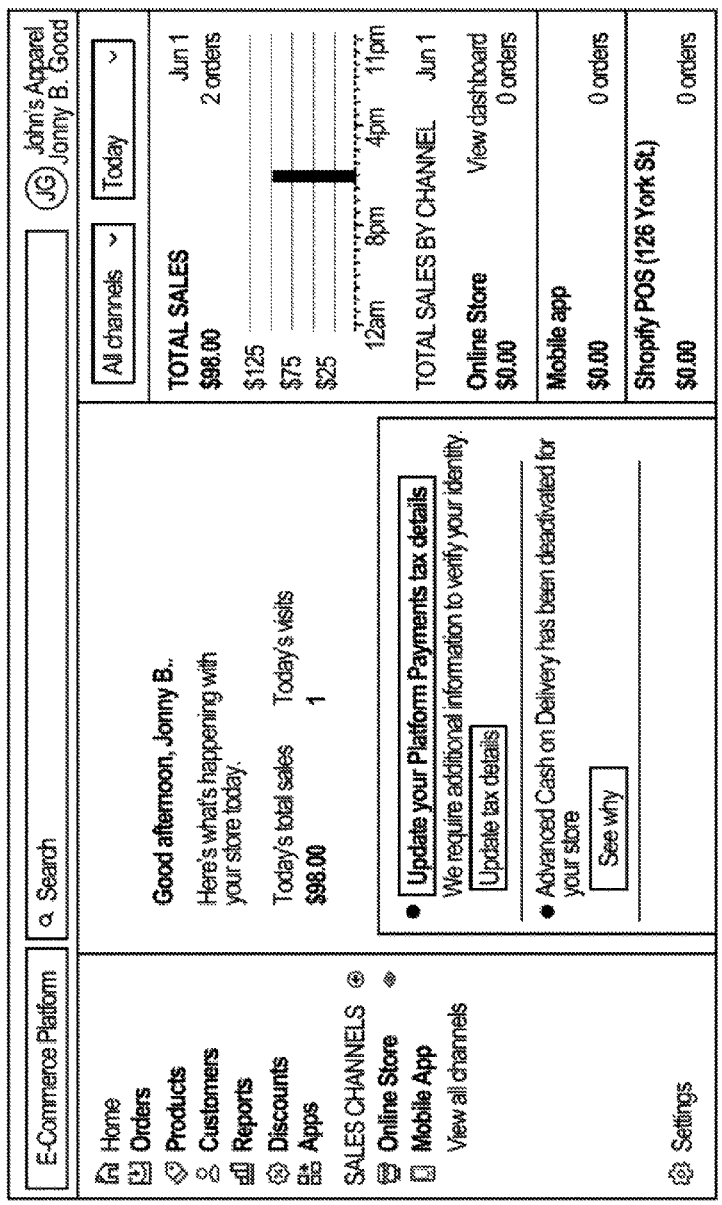
FIG. 2 depicts an embodiment for a home page of an administrator, according to an embodiment.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The ecommerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The ecommerce platform 100 may provide a financial facility 120 for secure financial transactions with customers, such as through a secure card server environment. The ecommerce platform 100 may store credit card information, such as in payment card industry data (PCI) environments (e.g., a card server), to reconcile financials, bill merchants, perform automated clearing house (ACH) transfers between an ecommerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the ecommerce platform 100 may provide for a set of marketing and partner services and control the relationship between the ecommerce platform 100 and partners. They also may connect and onboard new merchants with the ecommerce platform 100. These services may enable merchant growth by making it easier for merchants to work across the ecommerce platform 100. Through these services, merchants may be provided help facilities via the ecommerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the ecommerce platform 100. In some embodiments, the ecommerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The ecommerce platform 100 may store information about business and merchant transactions, and the data facility 134 may have many ways of enhancing, contributing, refining, and extracting data, where over time the collected data may enable improvements to aspects of the ecommerce platform 100.

Referring again to FIG. 1, in some embodiments the ecommerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the ecommerce platform 100 or applications 142B from outside the ecommerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the ecommerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the ecommerce platform 100 or through interfaces 140B provided to applications 142B and/or channels 110B outside the ecommerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the ecommerce platform 100.

In some embodiments, the ecommerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if the customer has never been there before, the platform payment facility 120 may recall their information to enable a more rapid and correct check out. This may provide a cross-platform network effect, where the ecommerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the ecommerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the ecommerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the ecommerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the ecommerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the ecommerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the ecommerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the ecommerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the ecommerce platform 100, and the like), or an application 142A or 142B being developed by internal personal resources associated with the ecommerce platform 100. In some embodiments, applications 142A-B may be assigned an application identifier (ID), such as for linking to an application (e.g., through an API), searching for an application, making application recommendations, and the like.

The commerce management engine 136 may include base functions of the ecommerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the ecommerce platform 100 may allow for an increasing number of merchant experiences to be built in applications 142A-B so that the commerce management engine 136 can remain focused on the more commonly utilized business logic of commerce.

The ecommerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate brow sing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information, such as an email address, billing information, and shipping details. On checkout, the merchant commits to pricing. If the customer inputs their contact information but does not proceed to payment, the ecommerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the ecommerce platform 100 may make the merchant aware of compliance issues with respect to legal obligations (e.g., with respect to taxes). In some embodiments, the ecommerce platform 100 may enable merchants to keep track of changes to the contract of sales over time, such as implemented through a sales model component (e.g., an append-only date-based ledger that records sale-related events that happened to an item).

Components of Illustrative System

Figure 3:
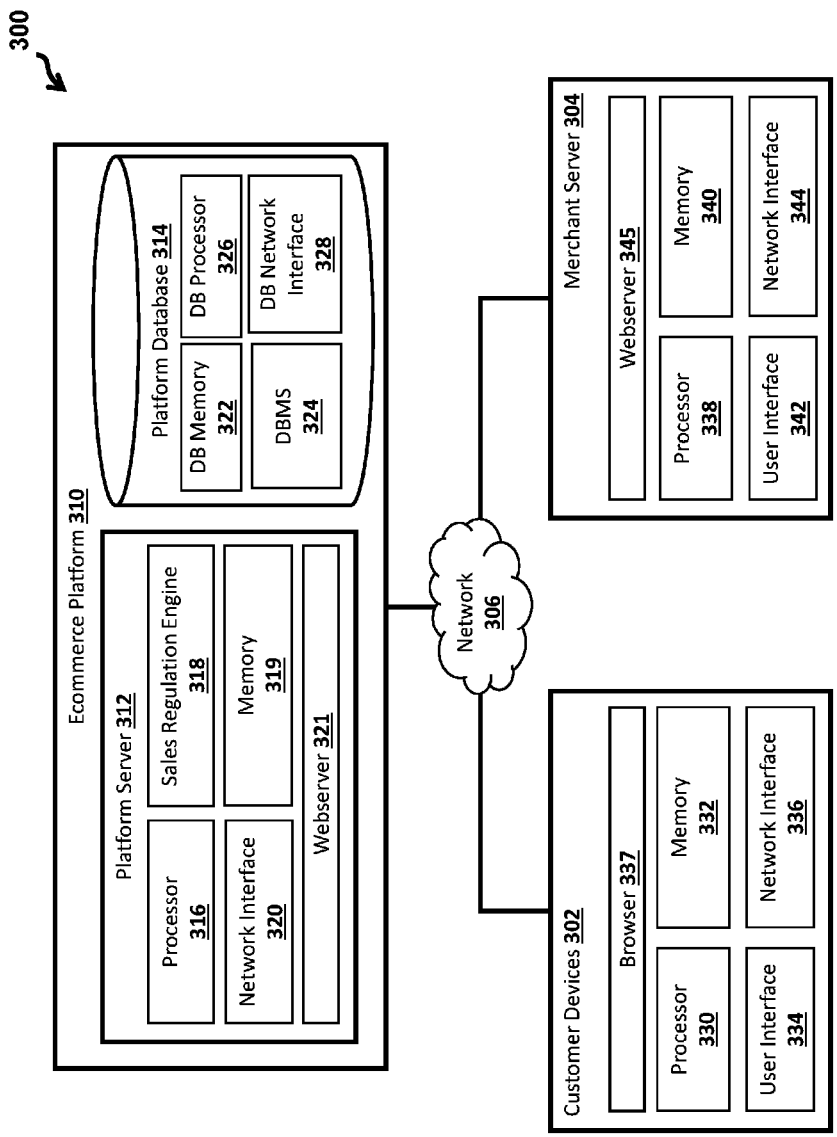
FIG. 3 shows components of a system, according to an embodiment.

FIG. 3 shows components of a system 300 according to an embodiment. The system 300 includes customer devices 302, merchant servers 304, and ecommerce platform 310, each of which may communicate with another via one or more networks 306. The system 300 is described and shown in FIG. 3 as having one of each component for ease of description and understanding of an example. It should, however, be appreciated that embodiments may include any number of the components described herein. It should be further appreciated that embodiments may comprise additional or alternative components, or may omit certain components, and still fall within the scope of this disclosure.

Network 306

The network 306 may include any number of public networks and/or private networks. The network 306 may comprise hardware and software components implementing various network and/or telecommunications protocols facilitating communications between various devices, which may include devices of the system 300 or any number of additional or alternative devices not shown in FIG. 3. The network 306 may be implemented as a cellular network, a Wi-Fi network, or other wired local area network (LAN) or wireless LAN, a WiMAX network or other wireless or wired wide area network (WAN), and the like. The network 306 may also communicate with external servers of other external services coupled to the network 306, such as servers hosting a social media platform or a banking platform.

The network 306 may include any number of security devices or logical arrangements (e.g., firewalls, proxy servers, DMZs) to monitor or otherwise manage web traffic to the ecommerce platform 310. Security devices may be configured to analyze, accept, or reject incoming web requests from customer devices 302 or merchant servers 304. In some embodiments, a security device may be a physical device (e.g., a firewall). A security device may be a software application (e.g., Web Application Firewall (WAF)) that is hosted on, or otherwise integrated into, another computing device of the system 300. The security devices monitoring web traffic are associated with, and administered by, the ecommerce platform 310.

Customer Devices 302 and Merchant Servers 304

Merchant servers 304 are electronic devices associated with merchant accounts of the ecommerce platform 310. Customer devices 302 are electronic devices associated with users (sometimes referred to herein as "client users") who are not operating as merchants, such as end-point customers or potential customers, who are visiting online stores of merchants on the ecommerce platform 310. In some circumstances, a customer device 302 and a merchant server 304 can be the same device, as merchants may sometimes navigate webpages for online store websites of the ecommerce platform 310 when the merchant is acting in the capacity of a customer. As such, a customer device 302 may sometimes act as a merchant server 304 while at other times act as the customer devices 302. In an example, a merchant may use the same device to both configure the merchant settings for the online store (or other configuration settings) and then browse the online stores of other merchants on the ecommerce platform 310.

The customer device 302 may be a mobile phone, tablet, laptop or computer owned and/or used by a customer. The customer device 302 includes a customer processor 330, customer memory 332, customer user interface 334, and customer network interface 336. An example of a customer user interface 334 is a display screen (which may be a touch screen) and graphical user interface (GUI), a gesture recognition system, a keyboard, a stylus, and/or a mouse. The customer network interface 336 is provided for communicating over the network 306. The structure of the customer network interface 336 will depend on how the customer device 302 interfaces with the network 306. For example, if the customer device 302 is a mobile phone or tablet, the customer network interface 336 may include a transmitter/receiver with an antenna to send and receive wireless transmissions to/from the network 306. If the customer device 302 is a personal computer connected to the network 306 with a network cable, the customer network interface 336 may include, for example, a network interface card (NIC), a computer port, and/or a network socket. The customer processor 330 directly performs or instructs all of the operations performed by the customer device 302. Non-limiting examples of these operations include processing user inputs received from the customer user interface 334, preparing information for transmission over the network 306, processing data received over the network 306, and instructing a display screen to display information via the GUI of the customer user interface 334. The customer processor 330 may be implemented by one or more processors that execute instructions stored in the customer memory 332. Alternatively, some or all of the customer processor 330 may be implemented using dedicated circuitry, such as an ASIC, a GPU, or a programmed FPGA.

The merchant server 304 may be a mobile phone, tablet, laptop, or computer used by a merchant. The merchant server 304 includes a merchant processor 338, merchant memory 340, a merchant user interface 342, and a merchant network interface 344. An example of a merchant user interface 342 is a display screen (which may be a touch screen) and graphical user interface (GUI), a keyboard, a gesture recognition system, a stylus, and/or a mouse. The merchant network interface 344 is provided for communicating over the network 306. The structure of the merchant network interface 344 will depend on how the merchant server 304 interfaces with the network 306. For example, if the merchant server 304 is a mobile phone or tablet, the merchant network interface 344 may include a transmitter/receiver with an antenna to send and receive wireless transmissions to/from the network 306. If the merchant server 304 is a personal computer connected to the network 306 with a network cable, the merchant network interface 344 may include, for example, a NIC, a computer port, and/or a network socket. The merchant processor 338 directly performs or instructs all of the operations performed by the merchant server 304. Examples of these operations include processing user inputs received from the merchant user interface 342, preparing information for transmission over the network 306, processing data received over the network 306, and instructing a display screen to display information via the GUI of the merchant user interface 342. The merchant processor 338 may be implemented by one or more processors that execute instructions stored in the merchant memory 340. Alternatively, some or all of the merchant processor 338 may be implemented using dedicated circuitry, such as an ASIC, a GPU, or a programmed FPGA.

The merchant server 304 includes software and hardware components enabling Internet or other forms of networked communication with components of the system 300 (e.g., platform server 312, customer device 302), as well as enabling the merchant server 304 to perform the various functions described herein. For example, the merchant server 304 executes merchant webserver software 345 (e.g., Apache®, Microsoft IIS®) to generate and present merchant webpages or other merchant information to the customer device 302 for the merchant's website, which is the merchant's online store. These are merely examples and are not intended to be limiting as to the potential arrangements or functions of the merchant server 304.

The customer device 302 executes a software application for navigating the merchant stores available through the ecommerce platform 310, where the software application could be a web browser 337 (e.g., Chrome®, Firefox®, Internet Explorer®) or a native buyer application ("app") published by (or otherwise associated with) the ecommerce platform 310 and installed on the customer device 302. The customer device 302 is described as executing the web browser 337 for ease of discussion, though there is no such limitation. When the customer selects the merchant store via the user interface 334 of the browser 337, the customer device 302 connects to the platform server 312 and the merchant server 304 hosting the merchant store webpage using one or more IP Addresses that the customer device 302 obtained by translating a domain name for the merchant store and the merchant server 304.

When the customer device 302 visits the online store of a merchant, the platform server 312 of the ecommerce platform 310 serves a catalog of available products offered by the merchant, displayed in a webpage GUI via the browser 337. The browser 337 transmits a request to the ecommerce platform 310 for the product information or webpage of the online store of the merchant. The platform server 312 receives the request for the webpage from the browser 337 and, in return, the platform server 312 and/or the merchant server 304 transmit(s) the requested product webpage of the merchant's online store for display via the browser 337. In operation, the platform server 312 provides a catalog webpage that presents the catalog of available merchant stores or products for display via the browser 337. The customer selects the particular merchant by entering a merchant selection input into the browser 337. In response to this input, the browser 337 transmits a request for a merchant webpage to the platform server 312 and the merchant server 304. The request for the merchant webpage instructs the platform server 312 and merchant server 304 to return the webpage containing the desired merchant information. The customer can then select the particular product of interest by entering a product selection input into the browser 337, causing the customer device 302 to transmit a request for a product webpage to the platform server 312 and the merchant server 304. The request for the product webpage instructs the platform server 312 and the merchant server 304 to return the webpage containing the product information. The browser 337 displays the webpage containing the product information to the customer.

The browser 337 accesses and interacts with the webpages of the merchant's online website. Each webpage of the merchant's online store web site comprises various types of content. The machine-readable code of the webpage content includes executable instructions for the browser 337 to perform the various client-side operations, such as displaying visual content of the webpage (via the customer user interface 334), performing certain computations, calling/retrieving data files or executable scripts, or updating various types of data, among other operations performed by the browser 337 or the customer device 302. The webpage content includes the entire webpage, portions of the webpage, or sub-components of the webpage (e.g., applets, containers, elements, frames, features, data objects, data files). The code of the webpage content comprises one or more types of code languages or types of data (e.g., HTML, XML, CSS, PHP, JSON, JavaScript, Python). During execution, the browser 337 parses the code of the webpage content, performs the various operations according to the code, and exchanges data values with the merchant server 304 according to the code of the webpage content. For instance, the browser 337 identifies the call to the script (or other machine-executable code) within the code of the webpage content and then executes the computations of the script.

As an example, the customer device 302 transmits the request for webpage content of the merchant store to the merchant server 304 through the platform server 312. The merchant webserver software 345 executed by the merchant server 304 generates and returns the requested content to the customer device 302. The browser 337 of the customer device 302 parses the machine-readable code (e.g., HTML, XML, JavaScript, PHP, Ruby, Python) of the webpage content and interprets the code into the machine-executable instructions executed by the customer processor 330 to perform various browser-side (or client-side) operations. Non-limiting examples of such browser 337 operations interpreted and prompted by the instructions include: displaying certain content via the browser 337 and the customer user interface 334; fetching or calling scripts or data files; or performing the various computations, among other client-side operations.

The client-side computations can include any number of operations performed by the browser 337 and indicate the browser 337 has processed the webpage entirely or nearly entirely (e.g., rendered most/all the GUI features). The client-side computations may include generating or incrementing a value in a defined fashion involving multiple computations, or performing a computationally complex algorithm (e.g., hash algorithms such as, for example, cryptographic hash algorithms like, for example, SHA-256). In some cases, such operations may be performed more than once and/or in combination such as, for example, requiring a device to perform multiple iterative computations (e.g., to identify a value that hashes to a defined hash value). Such complex algorithms generally require comparatively more clock cycles, maintain privacy over certain information, and/or obfuscate the test values to inhibit reverse engineering. Other examples of client-side operations include running the processor for a certain number of clock cycles/time of the platform processor 330 at a certain rate, updating a blockchain, querying and applying an encryption certificate stored in memory 332, or performing proof-of-work operations.

In some cases, the client-side computations should output a particular value (e.g., the updated test value) when performed in accordance with the instructions of the script executed by the browser 337. The browser 337 sends the updated test values in the requests for operations or at any given time to the merchant server 304 and/or platform server 312 for evaluation of whether the customer device 302 is operated by a human user. For instance, the platform server 312 compares the value received from the browser 337 (e.g., inbound value) against an expected test value (e.g., particular value that should be outputted from the computations). Based on the comparison, the platform server 312 determines whether the inbound value purporting to the particular value is a match.

The webpage content returned from the platform server 312 and/or the merchant server 304 includes a line item of machine-readable code that is persistent during or otherwise associated with the ongoing browser session. When the customer decides to purchase the product and indicates the product is part of a transaction (e.g., "add to cart"), the customer selects an interactive element of the webpage (e.g., button, hidden/visible form) of the customer user interface 334. In response to the customer device 302 receiving the input, the customer device 302 transmits the request for the webpage content that associates the line item (of the product) with session. The request instructs the platform server 312 and the merchant server 304 to associate the selected product with the ongoing browser session (e.g., added to cart) and return the line item of code with an updated webpage or new webpage. The devices of the system 300 reference or include the line item in the data exchanges of the session. For instance, when the customer clicks a button to add a product to the cart for the session, the browser 337 sends the request for the transaction to update the customer's cart to the merchant server 304. In response to the transaction request, the merchant server 304 returns another webpage or updates the current webpage to include a hidden or visible element, such as an HTML element, PHP element, and/or a JavaScript function, among others.

When the customer device 302 connects with the merchant webserver 345 or at a given time thereafter, the browser 337 and the merchant server 304 establish a session (e.g., client-side HTTP session, server-side HTTP session) based on the browser 337 successfully accessing the merchant's webpage of the merchant website. By establishing the session, the browser 337 and/or the merchant webserver 345 will maintain, access, store, and update persistent state information about the ongoing session, enabling the browser 337 and merchant webserver 345 associated with the session to track events and data occurring during the interactions between the browser 337 and the webserver 345. Data traffic between the customer device 302 and the merchant server 304 flows through the ecommerce platform 310, allowing the platform server 312 to monitor and access the data traffic and associate with the session. The various types of information generated during the session, such as the test values or the line items (code representing particular products), are stored into the customer memory 332, the merchant memory 340, platform memory 319, or other non-transitory machine-readable storage medium.

As mentioned, the browser 337 parses the code of the webpage content returned from the merchant server 304 and performs operations based on the parsed code. For instance, the webpage content can include visual or hidden HTML elements (e.g., buttons, images, hidden or visible form, text, hidden form), which the browser 337 uses to construct the webpage for display to the customer. The code of the webpage content also includes the machine-executable script to perform certain browser-side computations. An attribute of the HTML element can include a default or an initial test value and another attribute of the HTML element that includes the call to the script, which comprises instructions for the browser 337 or the customer processor 330 to perform computations for updating the test value. In operation, as the browser 337 constructs the webpage for display according to the parsed code, the browser 337 will execute the script's computations to generate the updated test value. The browser 337 stores the updated test value into the customer memory 332 or other machine-readable storage and associates each instance/iteration of the test value (e.g., default/initial test value, updated test value) with the session.

Notably, if the customer device 302 were executing a bot to interact with the merchant webserver 345 (rather than the browser 337), then the bot would fail to generate the updated test value. The bot is configured to efficiently communicate data with the merchant server 304 using an API that enables the bot to communicate the data with the merchant server 304 directly without processing any code related to user experience features and functions, which are ordinarily processed by the browser 337. Consequently, the bot may parse the code of the webpage, identify and extract the initial test value, and eventually submit the initial test value. The bot would, however, overlook the call to the script for performing browser-side computations to generate the updated test value. Even if the bot could be configured to process each component of the webpage containing the call to the script and perform the computations, the time and efficiency benefits of employing the bot would be mitigated or eliminated altogether. In addition, the automated execution of the bot performing the computations greatly, perhaps exponentially, increases the resource demands on the devices executing the bot. The jump in the resource demands would discourage the bot's user from deploying the bot to access the merchant servers 304 or the ecommerce platform 310.

The customer device 302 receives the initial test value with webpage content returned in response to one of the various types of requests. The requests include, for example, requests for certain processes/functions (e.g., purchase transaction process, post message, update data in a platform database 314) or requests for certain types of information or content (e.g., webpage, merchant information, product information, transaction records, user information). When the browser 337 sends the particular request to the merchant server 304 or the platform server 312, the merchant webserver 345 or the platform webserver 321 returns the responsive webpage content having the initial test value. The browser 337 then executes the computations to update the test value and stores the test value. When the browser 337 submits another request to the merchant webserver 345 or platform webserver 321, the browser 337 sends the updated test value along with the follow up request. By contrast, the bot would send the initial test value, rather than the updated test value.

As an example, the customer may initiate the purchase transaction process for buying the intended product from the merchant store. The browser 337 submits a first request for the webpage containing the product information. The webpage includes a hidden HTML element and a visible image HTML element. Each element of the product webpage includes an attribute with the initial test value and the call to the script for performing the computations to update the test value. The browser 337 parses the code to render or otherwise construct the product webpage, at which time the browser 337 is prompted to call the script and perform the computations to generate the updated test value. In this example, there are two webpage components prompting the browser 337 to call the script. The browser 337 takes the initial value as input for the first set of computations to generate a first iteration of the updated test value, and then takes the first iteration of the updated test value to generate a second iteration of the updated test value.

Continuing with the example above, when the customer wants to purchase the product, the customer interacts with a GUI element (e.g., button) to send a second request for initiating the purchase transaction process and associating the product's line item code with the session (e.g., add the intended product to the cart). When sending the second request, the browser 337 and/or another component of the system 300 (e.g., merchant webserver 345, platform webserver 321) associates the line item with the ongoing session. The browser 337 or the merchant webserver 345 updates the visual display of the webpage (e.g., updates the cart indicator display). Moreover, in response to the second response, the merchant webserver 345 returns a checkout webpage having various elements, including an HTML form for submitting the customer's purchase order information to the merchant webserver 345 and platform webserver 321. The form includes an attribute with the initial test value and the call to the script for performing the computations to update the second iteration of the test value. The initial test value could be the same or new initial test value or the current test value for the session (e.g., the second iteration of the test value). The computations of the script take the current test value (e.g., the second iteration of the updated test value) as an input to update the current test value, thereby generating a third iteration of the updated test value. When the customer is ready to place the purchase, the customer interacts with a GUI element (e.g., button) of the checkout webpage to send a third request for submitting the purchase order information and completing the transaction to the platform webserver 321 and merchant webserver 345. The browser 337 sends the current test value (e.g., the third iteration of the test value) to the merchant webserver 345 and/or the platform webserver platform webserver 321, along with the third request.

The platform webserver 321 or merchant webserver 345 evaluates the test value submitted with the third request to determine whether to permit the requested transaction process or halt the transaction process. If the test value fail to satisfy the evaluation, then the platform webserver 321 or merchant webserver 345 disassociates the line item from the session (e.g., removes the item from the cart) and returns instructions for the browser 337 to update any related visual displays (e.g., updates the cart indicator to be empty). If the test value satisfies the evaluation, then the platform webserver 321 and merchant webserver 345 accept the purchase order information and execute various operations for processing the transaction, such as forwarding billing information to a banking system for payment.

Ecommerce Platform 310

The ecommerce platform 310 is a computing system infrastructure owned and managed by an ecommerce service and, in some embodiments, may be the same as or similar to that described with reference to FIG. 1, though this need not be the case. The ecommerce platform 310 includes electronic hardware and software components capable of performing various processes, tasks, and functions of the ecommerce platform 310. For instance, the computing infrastructure of the ecommerce platform 310 may comprise one or more platform networks (not shown) interconnecting the components of the ecommerce platform 310. The platform networks may comprise one or more public and/or private networks and include any number of hardware and/or software components capable of hosting and managing the networked communication among devices of the ecommerce platform 310.

The ecommerce platform 310 comprises the platform server 312 and the platform database 314, though embodiments may include additional or alternative components capable of performing the operations described herein. The components of the ecommerce platform 310 may be embodied in separate computing devices interconnected via one or more public and/or private internal networks, while some components of the ecommerce platform 310 may be integrated into a single device. For instance, the platform server 312 could host the platform database 314, even though such integration is not shown in FIG. 3. Furthermore, the ecommerce platform 310 may include any number of platform servers 312 (described further below) configured to serve various functions of the ecommerce platform 310. Moreover, the ecommerce platform 310 is shown and described as having only one platform server 312 performing each of the various functions of the ecommerce service for ease of discussion. It should, however, be appreciated that FIG. 3 is merely illustrative and that embodiments are not limited to the description of system 300 or what is shown in FIG. 3. The software and hardware of the platform server 312 may be integrated into a single distinct physical device (e.g., a single platform server 312) or may be distributed across multiple devices (e.g., multiple platform servers 312). For example, some operations may be executed on a first computing device while other operations may be executed on a second computing device, such that the functions of the platform server 312 are distributed among the various computing devices. In some implementations, the platform server 312 may be a virtual machine (VM) that is virtualized and hosted on computing hardware configured to host any number of VMs.

Platform Database 314

The platform database 314 stores and manages data records concerning various aspects of the ecommerce platform 310, including information about, for example, buyers, merchants, recipients, transactions, electronic devices, merchant offerings (e.g., products, inventory, services), various metrics and statistics, machine-learning models, merchant pages hosting merchant stores, and other types of information related to the ecommerce platform 310. The platform database 314 is hosted on any number of computing devices having a processor (sometimes referred to as a database (DB) processor 326) and non-transitory machine-readable memory configured to operate as a DB memory 322, and capable of performing the various processes and tasks described herein. For example, one or more platform servers 312 may host some or all aspects of the platform database 314.

The computing device hosting the platform database 314 may further include a DB network interface 328 for communicating via platform networks of the ecommerce platform 310. The structure of the DB network interface 328 will depend on how the hardware of the platform database 314 interfaces with other components of the ecommerce platform 310. For example, the platform database 314 may be connected to the platform network with a network cable, the DB network interface 328 may include, for example, a NIC, a computer port, and/or a network socket. The DB processor 326 directly performs or instructs all of the operations performed by the platform database 314. Non-limiting examples of such operations include processing queries or updates received from platform servers 312, customer devices 302, and/or merchant servers 304; preparing information for transmission via the platform network and/or the external networks 306; and processing data received via the platform network and/or the external networks 306. The DB processor 326 may be implemented by one or more processors that execute instructions stored in the DB memory 322 or other non-transitory storage medium. Alternatively, some or all of the DB processor 326 may be implemented using dedicated circuitry, such as an ASIC, a GPU, or a programmed FPGA.

Moreover, a computing device hosting the platform database 314 may include and execute database management system (DBMS 324) software, though DBMS 324 is not required in every configuration. The platform database 314 can be a single, integrated database structure or may be distributed into any number of database structures that are configured for some particular types of data needed by the ecommerce platform 310. For example, a first database could store user credentials and be accessed for authentication purposes, and a second database could store raw or compiled machine-readable software code (e.g., HTML, JavaScript) for webpages such that the DB memory 322 is configured to store information for hosting webpages. The DB memory 322 of the platform database 314 may contain the recipient data records, transaction data records, and/or merchant data records. The platform server 312 may issue queries to the platform database 314 and updates based upon, for example, merchant transaction records or new user records (e.g., new buyer, new recipient) of the ecommerce platform 310. The platform database 314 further stores various types of data received from customer devices 302 or merchant servers 304.

Platform Server 312

The platform server 312 may be any computing device that comprises a server processor 316 and non-transitory machine-readable storage media (e.g., server memory 319) and that is capable of executing the software for one or more functions, such as a sales regulation engine 318. In some cases, the server memory 319 may store or otherwise contain the computer-executable software instructions, such as the sales regulation engine 318. The software and hardware components of the platform server 312 enable the platform server 312 to perform various operations described herein. For example, the platform server 312 executes platform webserver software 321 (e.g., Apache®, Microsoft IIS®). As another example, the platform server 312 may execute software for monitoring and analyzing data traffic between customer devices 302, merchant servers 304, and the ecommerce platform 310. These are merely examples and are not intended to be limiting as to the potential arrangements or functions of the platform servers 312. Non-limiting examples of the platform server 312 may include desktop computers, laptop computers, and tablet devices, among others.

The sales regulation engine 318 monitors and analyzes the data traffic to mitigate bot activity on the merchant servers 304 of the ecommerce platform 310. The sales regulation engine 318 evaluates one or more test values received from the customer device 302 and determines whether the merchant server 304 or platform server 312 should permit and process each of the requests received from the customer device 302. The sales regulation engine 318 need not be a component of the platform server 312 or the ecommerce platform 310. In some embodiments, the sales regulation engine 318 is a component of and executed by the merchant server 304.

In some implementations, the platform server 312 updates or manipulates the data packets or code of the webpage content transmitted from the merchant server 304 to the customer device 302. The platform server 312 could revise the webpage content to prompt certain operations from the browser 337. For example, the platform server revised the webpage content by embedding the initial test value and the call to the script into one or more portions of the webpage content. Additionally or alternatively, the merchant server 304 could perform some or all of the operations of the platform server 312, such as embedding the test values or the call to the script, among others.

In some configurations, the platform server 312 accesses or maintains the state data for the session, allowing the platform server 312 to maintain stateful awareness of the current and/or prior test values for any given point in time during the session. In some cases, the platform server 312 generates and stores the updated test value into a storage medium associated with the session and accessible to the platform server platform server 312, such as the platform memory 319 or the DB memory 322. For example, the platform server 312 can receive and store the updated test value into the platform memory 319, for each instance/iteration that the customer device 302 generates a next iteration of the updated test value. When evaluating future requests from the browser 337, the platform server 312 references the current test value stored in the platform memory 319 and treats the current test value as an expected value. The inbound value from the browser 337 may be a value purporting to be a particular value expected by the browser 337. To evaluate the inbound test value received from the customer device 302, the sales regulation engine 318 (or other aspect of the platform server 312) compares the inbound test value against the expected test value (e.g., the current test value in the platform memory 319).

Additionally or alternatively, the sales regulation engine 318 (or other aspect of the platform server 312) generates the expected test value in parallel to or before the customer device 302, using the computations of the script. Performing these computations should produce expected test values matching to corresponding inbound test values from the customer device 302. In operation, the platform server 312 establishes a default/initial expected value as the default/initial test value of the session, which is the initial test value first provided to the customer device 302. The sales regulation engine 318 generates the expected test value by performing the computations of the script in parallel to the customer device 302 or at some time prior to the customer device 302. Each time that the sales regulation engine 318 updates the expected test value, the platform server 312 stores the current expected test value into the platform memory 319. As before, the platform server 312 evaluates the inbound test value received from the customer device 302 by comparing the inbound test value against the current expected value.

As mentioned, the sales regulation engine 318 evaluates the inbound test value from the browser 337 against a previous iteration of the test value (e.g., initial test value) or against an expected test value (e.g., generated in parallel by the sales regulation engine 318; stored in the platform memory 319). The sales regulation engine 318 determines that the inbound test value is improper if the inbound test value matches the previous iteration or does not match the expected test value. The platform server 312 may perform any number of remedial operations in response to determining that the customer device 302 is executing the bot, due to an improper inbound test value. Non-limiting examples of remedial actions include removing the line item object from the browser session (e.g., emptying the cart), ending or restarting the session, preventing further access to the webpage or website, requiring additional pages of information from the browser 337, requiring the browser 337 to perform additional operations that increase computational demands or time delays on the customer device 302 (e.g., captchas®, timeouts, deprioritizing/delaying requests), capturing information about the source of the bot (e.g., IP address, MAC address), and sending an email to an administrative user, among others.

Additional Example of a System Embodiment

Figure 4:
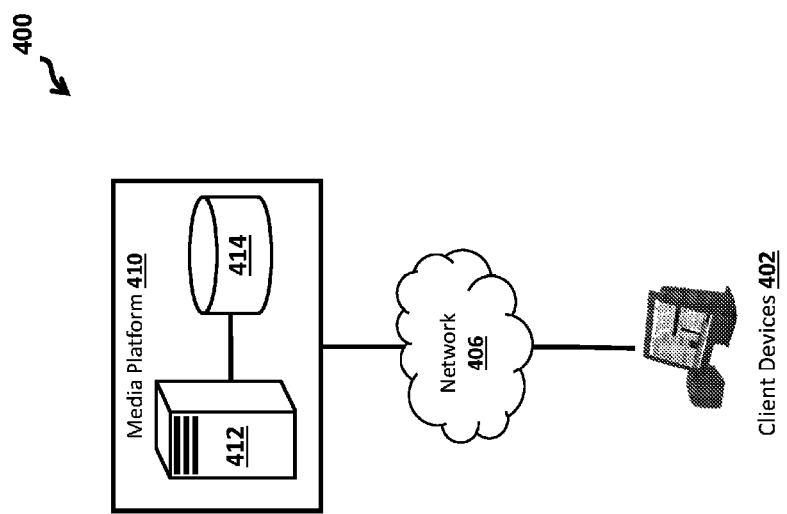
FIG. 4 shows components of a system, according to an embodiment.

FIG. 4 shows components of a system 400 according to an embodiment. The system 400 includes client devices 402 and media platform 410, each of which may communicate with another via one or more networks 406. The system 400 is described and shown in FIG. 4 as having one of each component for ease of description and understanding of an example. It should, however, be appreciated that embodiments may include any number of the components described herein. It should be further appreciated that embodiments may comprise additional or alternative components, or may omit certain components, and still fall within the scope of this disclosure. Certain components of the system 400 have been previously described in detail and are not described again for ease of description and understanding, though such features and functions could be included in embodiments such the system 400.

Network 406

The network 406 may include any number of public networks and/or private networks. The network 406 comprises hardware and software components implementing various network and/or telecommunications protocols facilitating communications between various devices, which may include devices of the system 400 or any number of additional or alternative devices not shown in FIG. 4. The network 406 may be implemented as a cellular network, a Wi-Fi network, or other wired local area network (LAN) or wireless LAN, a WiMAX network or other wireless or wired wide area network (WAN), and the like. The network 406 may also communicate with external servers of other external services coupled to the network 406, such as servers hosting a social media platform or a banking platform.

Media Platform 410

The media platform 410 is a computing system infrastructure operated or managed by a service hosting a social media website or other type of web site that facilitates community participation from end-users. The media platform 410 includes electronic hardware and software components capable of performing various processes, tasks, and functions of the media platform 410. The media platform 410 may include, for example, internal networks (not shown) that interconnect components of the media platform 410, such as the media platform servers 412 and devices hosting the media platform databases 414. A client device 402 accesses webpages of the website to view various types of media, such as media posted by other users or published by the media platform 410. Examples of the media platform 410 include a social media website, a news or magazine publication website, a blog, or the like.

The media platform database 414 stores and manages data records concerning various aspects of the media platform 410, including information about, for example, users, user profiles, posts, user detail information, user connections, and other types of information related to the media platform 410. The media platform database 414 is hosted on any number of computing devices having a processor and non-transitory machine-readable memory configured to operate as the storage medium, and capable of performing the various processes and tasks described herein. For example, one or more media platform servers 412 may host some or all aspects of the media platform database 414.

Media Platform Server 412

The media platform server 412 may be any computing device that comprises a processor and non-transitory machine-readable storage media and that is capable of executing the software for one or more functions. The software and hardware components of the media platform server 412 enable the media platform server 412 to perform various operations described herein. For example, the media platform server 412 executes webserver software (e.g., Apache®, Microsoft IIS®) for hosting the media website. As another example, the media platform server 412 executes software for monitoring and analyzing data traffic from the client devices 402. These are merely examples and are not intended to be limiting as to the potential arrangements or functions of the media platform servers 412. Non-limiting examples of the media platform servers 412 may include desktop computers, laptop computers, and tablet devices, among others.

The media platform server 412 monitors and analyzes the data traffic to mitigate bot activity on the media site. The media platform server 412 evaluates one or more test values received from the client device 402 and determines whether the media platform server 412 should permit and process requests received from the client device 402. The media platform server 412 can determine that the particular end-user is logged in to the media website according to user information in the 414 and tailor the webpage information sent to the client device 402 and access privileges according to the particular user. The media platform server 412 accepts certain input information (e.g., posts) and adds the posts to the media platform database 414, which the media platform server 412 then references when preparing webpage information for other users across the media platform 410. For instance, the media platform server 412 determines that the end-user is connected or associated with another user and will therefore extract posts submitted by that other user for display to the end-user on a landing page (e.g., tailored news feed).

In addition, the media platform server 412 generates the code of webpage content to include an initial/default test value and a call to a browser-executed script for updating the test value by performing various computations. The media platform server 412 evaluates the test values received from the client device 402 to determine whether the client device 402 navigating the media website is operated by a human end-user or the client device 402 is executing a bot.

Client Devices 402

The system 400 comprises any number of client devices 402 that communicate with the media platform 410 by accessing the webpages of the media website and exchanging data with the media platform server 412. The client device 402 may any computing device comprising a processor and non-transitory machine-readable store containing software that enable the client device 402 to perform the various processes and tasks described herein. Non-limiting examples of the client device 402 may include a mobile phone, tablet, laptop, or desktop computer. The client device 402 executes a software application for navigating the webpages of the media site, where the software application could be a web browser (e.g., Chrome®, Firefox®, Internet Explorer®) or a native buyer application ("app") published by (or otherwise associated with) the media platform 410 and installed on the client device 402. When the end-user navigates the browser to the media site, the client device 402 connects to the media platform server 412 hosting the webpage, using one or more IP Addresses that the client device 402 obtains by translating a domain name for the media site and media platform server 412.

The browser accesses and interacts with the webpages of the media website. Each webpage of the media website comprises various types of content. The machine-readable code of the webpage content includes executable instructions for the browser of the customer device 402 to perform the various client-side operations, such as displaying visual content of the webpage, performing certain computations, calling/retrieving data files or executable scripts, or updating various types of data, among other operations performed by the browser or the customer device 402. The webpage content includes the entire webpage, portions of the webpage, or sub-components of the webpage (e.g., applets, containers, elements, frames, features, data objects, data files). The code of the webpage content comprises one or more types of code languages or types of data (e.g., HTML, XML, CSS, PHP, JSON, JavaScript, Python). During execution, the browser parses the code of the webpage content, performs the various operations according to the code, and exchanges data values with the media platform server 412 based on the code of the webpage content. The browser identifies the calls to the script (or other machine-executable code) within the code of the webpage content, and then the browser executes the computations of the script according to the machine-readable code. The computations of the script, when executed by the browser, update a test value associated with the client device 402 and/or browser session. The media platform server 412 references one or more test values to determine whether the client device 402 is operated by a human user or is executing a bot to interact with the media site.

When the client device 402 visits the media website, the media platform server 412 returns a landing webpage containing personalized content (e.g., a "news feed") or a listing of available content. Portions of the landing page's code comprise an initial test value or the call to the script for performing certain computations, which could be employed to update the test value. For example, the landing page comprises a hidden HTML element comprising an attribute indicating the initial test value for the session and an attribute containing the call to the browser-executed script. The browser parses the code of the landing page and constructs the display at the GUI of the client device client device 402. By virtue of attempting to process and load the available aspects of the landing page, the browser will eventually detect, call, and execute the script referenced in the attribute of the particular element. The script causes the browser and the client device 402 to generate the updated test value by performing various computations.

When the end-user elects to submit a post on the landing the page (or any other page of the website), the end-user enters an instruction via a GUI element (e.g., button) to the browser that instructs the browser to send a request to enter the post to the webserver of the media platform server 412. The media platform server 412 will return updated webpage content that, for example, activates a text field or other interactive GUI element allowing the end-user to enter, upload, or create the intended post. In some implementations, the browser submits the updated test value with the request to enter the post to the media platform server 412. The media platform server 412 compares the updated test value against the initial test value and determines that there is no match, since the browser of the client device 402 executed the script to generate the updated test value. The bot, however, would have submitted the initial test value with the request because the bot would overlook the attribute instructing the browser to call the script.

Additionally or alternatively, the media platform server 412 evaluates multiple test values when, for example, the browser attempts to finalize the intended post. The updated webpage content (received in response to the request to enter the post) further includes a submission GUI element that, when activated, sends a request to finalize the post to the media platform server media platform server 412. This request instructs the media platform server 412 to accept and commit the post to one or more webpages of the media website. The request may also instruct the media platform server 412 to add the intended post to the media platform database 414. In an example, the submission element (for the submission request) is an HTML element comprising an attribute indicating the initial value for the session and another attribute containing the call to the script. As before, the browser detects, calls, and executes, by virtue of actually loading the attributes of the submission element. The browser performs the computations to generate a second iteration of the updated test value. The end-user actuates the submission element and submits the request to finalize the post with the second iteration of the updated test value.

The media platform server 412 compares the second iteration of the updated test value against the first iteration of the test value and determines that there is no match. As a result, the media platform server 412 permits the submission/finalization process to proceed according to the request. If the media platform server 412 determines that the browser failed to generate the second iteration of the updated test value, then the media platform server 412 would halt the submission process and/or perform various remedial operations, such as allowing the end-user another opportunity to submit/finalize the post or ending the browser session.

Illustrative Methods of Operation

Figure 5:
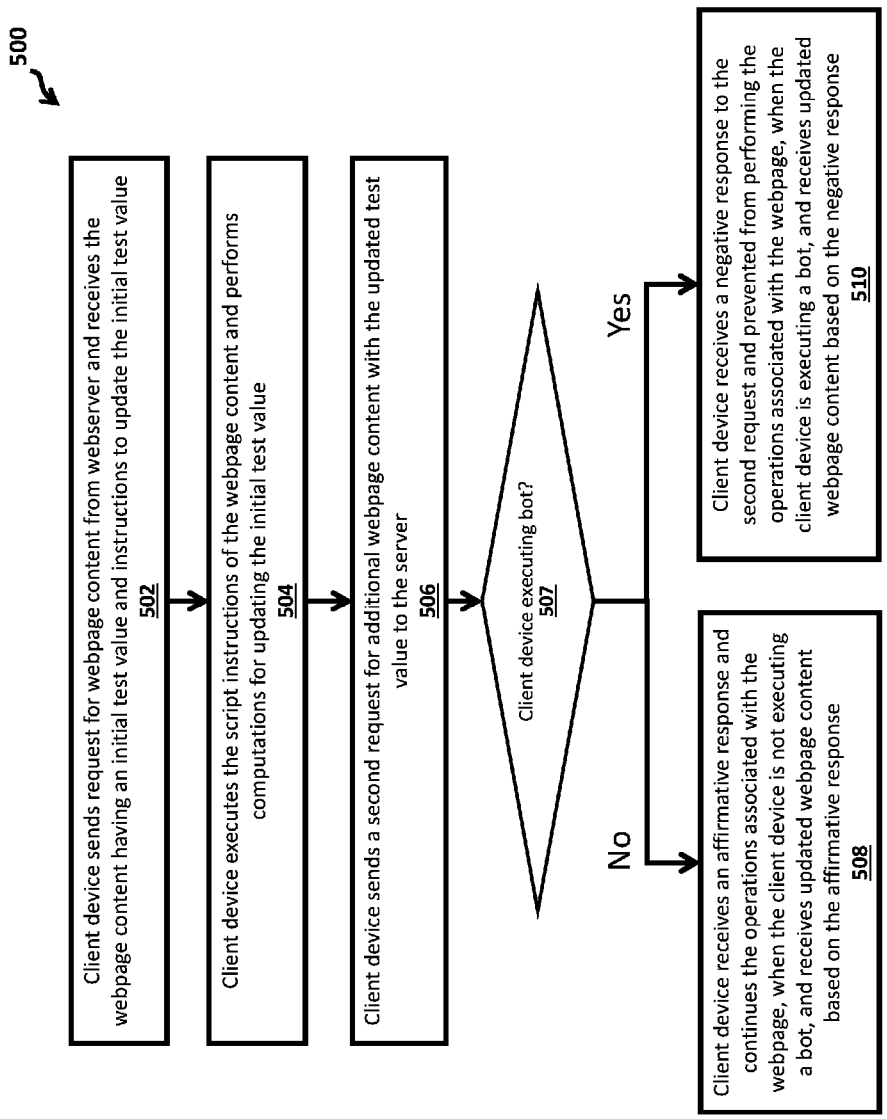
FIG. 5 shows steps of executing a method by a client device, according to an embodiment.

FIG. 5 shows steps of executing a method 500 by a client device, according to an embodiment. The client device accesses a website hosted by a server or another device that the server monitors. The client device executes a software application that accesses and interacts with the webpages or other content of the website. The server determines whether the client device is executing a bot or human-operated software when accessing the website content based upon test values exchanged between the client device and the server. The client device of the method 500 is described executing the bot or a web browser, though the client device could execute other types of human-operated software to interact with the content of the server, such as a native software application ("app") published by the website host.

A webpage of the website comprises various types of content that the client device requests or that the server returns to the client device. Machine-readable code of the webpage content includes executable instructions for the browser of the client device to, for example, display visual content on the webpage, perform certain computations, call/retrieve certain data files or executable scripts, or update various types of data, among other operations performed by the browser or client device operations. The webpage content may be an entire webpage, portions of the webpage, sub-components of the webpage (e.g., applets, containers, elements, frames, features, data objects, data files). The code of the webpage content comprises one or more types of code languages or types of data (e.g., HTML, XML, CSS, PHP, JSON, JavaScript, Python). The application executed by the client device (e.g., browser, bot) parses the code of the webpage content and exchanges data values with the server according to the code of the webpage content. When the application is the client's web browser, the browser identifies and executes calls to a script (or other machine-executable code) within the code of the webpage content. The browser then executes the instructions of the script (e.g., performs computations).

In step 502, the client device sends a request for webpage content to the server and receives the requested webpage content from the server. The webpage content includes an initial test value and instructions for the client device to update the test value. The code of one or more components of the webpage includes the initial test value and an embedded call to a browser-side executable script that instructs the client device to perform computations for generating the updated test value. For example, an attribute of an HTML element could indicate the initial test value and another attribute of the HTML element could indicate a variable for the updated test value, whereby the variable prompts the client device to execute the script (e.g., JavaScript function) and generate the updated test value.

The client device could readily access and identify the initial test value by parsing and reviewing the code of the webpage. But the client device generates the updated value by calling and executing the script, which is embedded within one or more components of the webpage processed by the browser and ignored by the bot. In the example above, the browser attempts to parse and process each component of the webpage, including the HTML element and each of the attributes. The bot, however, extracts data that the bot deems necessary to exchange with the server and advance the interaction, and skips or ignores the code of the webpage related to the user interface or user experience. As such, the bot would extract the initial test value from the corresponding attribute because the bot would deem the initial test value as a requirement for submission to the server. But the bot would overlook the other attribute containing the call to the script to generate the updated test value, because the bot would perceive the other attribute as merely related to the user interface or user experience.

At a given point in the interaction between the devices, the client device and the server establish a session (e.g., client-side HTTP session, server-side HTTP session, TCP session) that allows one or each of the computing devices to maintain a persistent state of information (e.g., initial test value, updated test value, expected test value, user data, merchant data, line items, transaction data) through the ongoing session. The devices can establish the session before, after, or in response to the request for the webpage content of the current step 502.

In step 504, the client device executes the script instructions of the webpage content and performs computations for updating test value. The client device parses and processes the code of the webpage content returned from the server. When the application is the client's browser, the browser identifies and executes the call to the script within the code of the webpage content. The script instructs the client device to perform the computations for generating the updated test value. In some cases, the script instructs the client device to reference the initial test value (or previously generated test value) as an input to generate the updated test value.

Embodiments may employ any number of test values, though the method 500 mentions the initial test value and the updated test value. For example, the webpage content returned to the client device is the webpage with multiple components, each of which instructs the browser to update the test value. A first component is an element having attributes indicating the initial test value and the call to the script for performing computations that update the test value. A second component is another element having an attribute indicating the initial test value or a reference to the updated test value and another attribute indicating the call to the script, where the client device uses the previously generated updated test value as an input. In this example, the client device executes the script in multiple iterations to generate corresponding iterations of the updated test value.

In step 506, the client device sends a second request for additional webpage content from the client device. The client device also sends the test value with the second request. The test value could be the initial test value (unaltered by the client device) or the updated test value (generated according to the computations of the script). The additional webpage content could include various types of data. The additional webpage content could include, for example: updates to the webpage (e.g., update visual feature displayed on the webpage); a subsequent webpage (e.g., present a next webpage); update a browser session; update user data; and update transaction data, among other potential types of information and/or processes.

As an example, client device sends the first request to the server (as in previous step 402) to request a product webpage containing information about a product offered by a merchant hosting the website. The server of the merchant returns the webpage in response to the first request, and the browser of the client device processes the webpage components. The client user could select a given interactive element (e.g., button) to associate code for the product (e.g., line item) with the session (e.g., add the product to a cart) and proceed to checkout. In response to the input, the client device submits the second request to the server in the current step 506, where the second request includes the request to proceed with a transaction to purchase the product and advance to a checkout webpage.

As mentioned, if the client device executes the bot to access and interact with the bot, then the client device overlooks the instructions to perform the computations and thus fails to generate the updated test value. Rather, the bot employs an API to communicate data directly to the server. By referencing the API and the parsed code, the bot determines that the server will expect to receive the initial test value with the second request. Consequently, in these circumstances the bot extracts the initial test value from the code of the webpage and sends the initial test value with second request for the current step 506. If, however, the client device executes the human-operated browser to access the website, then the browser parses and executes the script for performing the computations to generate the updated test value in the previous step 504. In these circumstances, the client device sends the updated test value with the second request in the current step 506.

In determination step 507, the server determines whether the client device is executing the bot based on the results of the test values and/or other forms of information that the client device sent to the server.

In step 508, the client device receives an affirmative response to the second request and continues the operations associated with the webpage, when the server determines (in step 507) that client device is not executing the bot. The affirmative response includes updated webpage content that advances the intended process of the second request, where the updated webpage content of the affirmative response could include various types of code and processes for indicating to the client device the data input requirements associated with the website function requested in the second request. The affirmative response includes code that indicates to the browser that the server has updated the session based upon the data inputs and information submitted from client device.

As an example, the client-user attempts to purchase the particular product on the merchant website by entering an input via a GUI element (e.g., button) of the product information webpage. The browser generates and sends the updated test value with the second request (as in prior step 506) to initiate a purchase transaction process and proceed to the checkout webpage. The client device receives the affirmative response from the server (in the current step 508), where the server or the client device associates code representing the product (e.g., line item) with the browser session (e.g., add the product's line item to the cart) and returns updated webpage content (e.g., checkout webpage and updated session data) to the browser.

Alternatively, in step 510, the client device receives a negative response to the second request and prevented from performing the operations associated with the webpage, when the server determines (in step 507) that the client device is executing the bot. The negative response includes updated webpage content that inhibits the intended process or desired outcome of the bot, though the client device could receive any response or no response to the second request. The updated webpage content of the negative response could include various types of code and processes for indicating to the client device that the server halted the website function requested in the second request. The negative response includes code that indicates to the bot that the server restarted, updated, or ended the session. In some cases, the server updates the elements visually displayed on one or more webpages, though such visual changes are not required.

As an example, the bot attempts to purchase the particular product on the merchant website. The bot sends the initial test value and the second request, as in prior step 506, to initiate the purchase transaction process and proceed to the checkout page. The client device receives the negative response from the server, as in the current step 510, which disassociates the code representing the product (e.g., line item) from the browser session (e.g., removes the product line item from the cart) and returns updated webpage content.

Figure 6:
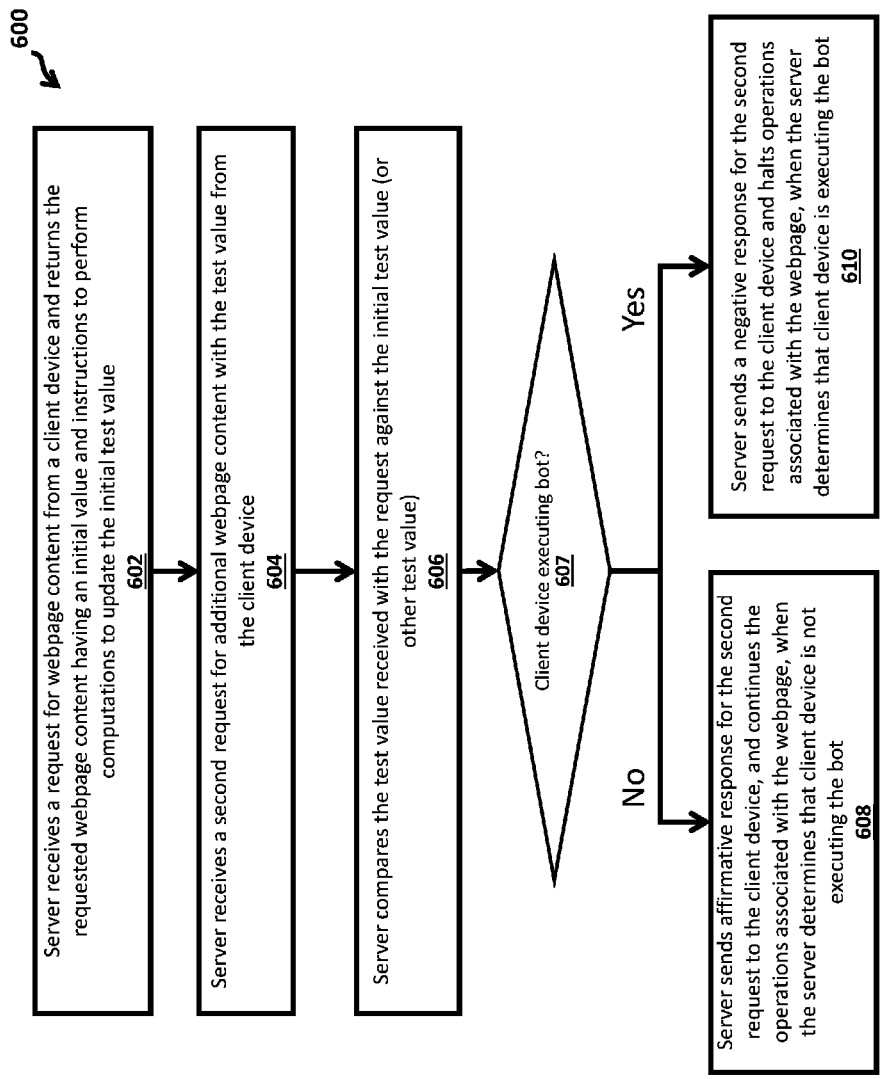
FIG. 6 shows steps of executing a method by a server device, according to an embodiment.

FIG. 6 shows steps of executing a method 600 by a server device, according to an embodiment. The server hosts a website or monitors web traffic of another server hosting the website. A client device executes a software application (e.g., browser, bot) that accesses and interacts with the webpages or other content of the website. The server determines whether the client device is executing the bot or human-operated software when accessing the website content based upon test values exchanged between the client device and the server. The client device of the method 600 is described executing the bot or the browser, though the client device could execute other types of human-operated software to interact with the content of the website, such as a native software application ("app") published by the website host.

A webpage of the website comprises various types of content that the server returns to the client device. Machine-readable code of the webpage content includes executable instructions for the browser of the client device to, for example, display visual content elements on the webpage, perform certain computations, call/retrieve certain data files or executable scripts, or update various types of data, among other operations performed by the browser or client device operations. The webpage content may be an entire webpage, portions of the webpage, sub-components of the webpage (e.g., applets, containers, elements, frames, features, data objects, data files). The code of the webpage content comprises one or more types of code languages or types of data (e.g., HTML, XML, CSS, PHP, JSON, JavaScript, Python). In operation, the software application executed by the client device (e.g., browser, bot) parses the code of the webpage content and exchanges data values with the server according to the code of the webpage content.

In step 602, the server receives a request for webpage content from a client device and returns the requested webpage content according to the request, where the webpage content includes an initial test value and instructions for the client device to update the test value. The code of one or more components of the webpage includes the initial test value and an embedded call to a browser-side executable script that instructs the client device to perform computations for generating the updated test value. For instance, an attribute of an HTML element could indicate the initial test value and another attribute of the HTML element could indicate a variable for the updated test value, whereby the variable prompts the client device to execute the script (e.g., JavaScript function) and generate the updated test value.

As an example, the server hosts a merchant's online store that presents product information to the client device. The server receives a request for a product webpage generally configured to display information about a particular product. In this example, the webpage content is the core content related to the product. The server receives the request from the browser of the client device and returns the product webpage responsive to the request. An element of the product webpage (e.g., input form, hidden form, buttons, text) includes an attribute indicating an initial test value and an attribute that invokes a browser-executed script (or other form of code), which instructs the browser to perform one or more computations to update the test value.

As mentioned, at some point in the interaction between the devices, the client device and the server establish a session (e.g., client-side HTTP session, server-side HTTP session, TCP session) that allows one or each of the computing devices to maintain a persistent state of information (e.g., initial test value, updated test value, expected test value, user data, merchant data, line items, transaction data) through the ongoing session. The devices can establish the session before, after, or in response to the request for the webpage content of the current step 602.

In step 604, the server receives a second request for additional webpage content from the client device. The server also receives the test value with the second request. The test value could be the initial test value (unaltered by the client device) or the updated test value (generated by the client device according to the computations of the script). The additional webpage content could include various types of data. The additional webpage content could include, for example: updates to the webpage (e.g., update visual feature displayed on the webpage); a subsequent webpage (e.g., present a next webpage); update a browser session; update user data; and update transaction data, among other potential types of information and/or processes.

The server receives the updated test value with the second request, if the client device executes the human-operated browser (or other application) to interact with the webpage and submit the second request. However, the server receives the initial test value with the second request, if the client device executes the bot to interact with the webpage and submit the second request. As mentioned, the bot parses the code of the webpage and processes only portions that the bot determines are required to proceed with a desired function (e.g., execute purchase transaction, post text/media). Consequently, the bot will fail to identify and execute the script for updating the initial test value, because the bot will skip the call to the script embedded in certain webpage content that the bot will not process.

In step 606, the server compares the test value received with the second request against the initial test value (or an expected test value) to determine (in step 607) whether the client device is interacting with the webpage using the browser or the bot. For instance, if the test value received from the client device matches the initial test value, then the server determines that the client device is likely executing the bot. Likewise, if the test value received from the client device does not match the initial test value, then the server determines that the client device is not executing the bot. In determination step 607, the server determines whether the client device is executing the bot based upon the comparison performed (in step 606).

In a configuration, the server accesses or maintains state data for the session that allows the server to maintain stateful awareness of the test value at a given point in time during the browser session. In some cases, the client device generates and stores the updated test value into a storage medium associated with the browser session and accessible to the server. For instance, the server can receive and store the updated test value into the memory of the server, for each instance that the client device generates the next updated test value. The server references the instance of the test value currently in the memory as the expected value. In step 606, the server compares the test value received from the client device against the corresponding expected test value currently in the memory.

Additionally or alternatively, the server generates the expected test value, which should match the corresponding test value of the client device. The server begins with the initial test value and generates the expected test value by performing the computations of the script in parallel to the client device or at a time prior to the client device. Each time the server updates the expected test value, the server stores the expected test value into the storage medium. In step 606, the server compares the test value received from the client device against the corresponding expected value currently in the memory.

In step 608, after the server determines that the client device is not executing the bot (in step 607), the server sends an affirmative response for the second request to the client device, and continues the operations associated with the webpage. The affirmative response transmitted by the server includes updated webpage content that advances the intended process of the second request. The updated webpage content could include various types of code and processes for indicating to the client device the requisite data inputs for the desired website function (e.g., purchase transaction process; post message to message board or social media page). The affirmative response includes code that indicates to the browser of the client device that the server updated the session based upon the data inputs and information submitted from client device.

As an example, when the client-user attempts to purchase a particular product on the merchant website, the server receives the updated test value with the second request (as in prior step 604), where the second request instructs the server to initiate a purchase transaction process. The server permits the process to proceed (as in the current step 608), after the server determines that the updated test value does not match the initial test value (i.e., the client device updated the initial test value) or determines that the updated test value matches the expected value (i.e., the client device updated the initial test value properly). The server executes processes of the affirmative response and/or sends the affirmative response to the client device. In this example, when preparing the affirmative response, the server associates the code representing the intended product (e.g., line item) with the browser session (e.g., add the product's line item to the cart) and returns updated webpage content (e.g., checkout webpage; updated session data) to the browser.

Alternatively, in step 610, when the server determines that the client device is executing the bot (in step 607), the server sends a negative response for the second request to the client device and halts operations associated with the webpage. The negative response transmitted by the server includes updated webpage content that inhibits the intended process or desired outcome of the bot, though the server could generate and transmit any response or no response to the second request. The updated webpage content of the negative response could include various types of code and processes for indicating to the client device that the server halted the website function requested in the second request. The negative response includes code that indicates to the bot that the server restarted, updated, or ended the session. In some cases, the server updates the elements visually displayed on one or more webpages, though such visual changes are not required.

As an example, when the bot attempts to purchase the particular product on the merchant website, the server receives the second request (as in prior step 604) that attempts to instruct the server to initiate the purchase transaction process and the test value. The server transmits the negative response to the client device (as in the current step 610), after the server determines that the test value from the server matches the initial test value (i.e., the client device failed to update the initial test value) or determines that the test value fails to match the expected value (i.e., the client device updated the initial test value incorrectly). The server executes processes of the negative response (e.g., halts/prevents transaction process) and/or sends the negative response to the client device. In this example, when preparing the negative response, the server disassociates the code representing the intended product (e.g., line item) with the browser session (e.g., remove the product's line item from the cart) and returns the updated webpage content (e.g., updates cart visual indicator to an empty status) to the browser.

In some embodiments, a computer-implemented method includes transmitting, by a server, a webpage comprising instructions for generating a particular value responsive to processing the webpage. The server may receive from a client device a request including a value purporting to be the particular value. The server may determine that the value purporting to be the particular value matches the particular value. Responsive to the server determining that the value purporting to be the particular value matches the particular value, the server may service the request.

In some implementations, a form is associated with the webpage, wherein the request corresponds to submission of the form to the server, and wherein the value is provided as an attribute of the form.

In some implementations, the server may receive the particular value from the client device; and storing, by the server, the particular data value into a memory for comparing against the value purporting to be the particular value.

In some implementations, the server may generate the particular value for comparing against the value purporting to be the particular value.

In some implementations, the processing of the webpage corresponds to rendering of the webpage by the client device, and wherein the value is determined based on the rendering.

In some implementations, the particular value is determined based on rendering of one or more GUI elements of the webpage.

In some implementations, the particular value is associated with a browser session of the client device.

In some implementations, the request indicates a line item object of the webpage according to a user input.

In some implementations, servicing the request includes updating, by the server, the line item object from the webpage.

In some implementations, the method further includes receiving, by a server, from a second client device a second request including a second value purporting to be a second particular value; and determining, by the server, that the second value purporting to be the second particular value matches the second particular value.

In some implementations, the second request indicates a second line item object of a second webpage according to a second user input. The method further includes disassociating, by the server, the second line item from a second browser session between the second client device and the server in response to determining that the second value purporting to be the second particular value matches the second particular value.

In some implementations, the instructions to generate the particular value include instructions to perform a plurality of browser operations at the browser processing the webpage, and where the particular value is updated based at least in part on the plurality of browser operations.

In some implementations, the webpage further includes instructions for rendering of an element and updating an initial value associated with the element from the initial value to the particular value. The method further includes updating, by the server, a status of a line item object according to the particular value associated with the element.

In some embodiments, a system comprises a non-transitory machine readable memory configured to store information a plurality of particular values; and a processor. The process is configured to: transmit a webpage comprising instructions for generating a particular value responsive to processing the webpage; receive from a client device a request including a value purporting to be the particular value; determine that the value purporting to be the particular value matches the particular value; and responsive to the server determining that the value purporting to be the particular value matches the particular value, service the request.

In some implementations, a form is associated with the webpage, wherein the request corresponds to submission of the form to the server, and wherein the value is provided as an attribute of the form.

In some implementations, the processor is further configured to receive the particular value from the client device; and store the particular data value into a memory for comparing against the value purporting to be the particular value.

In some implementations, the processor is further configured to generate the particular value for comparing against the value purporting to be the particular value.

In some implementations, the processing of the webpage corresponds to rendering of the webpage by the client device, and wherein the value is determined based on the rendering.

In some implementations, the processor is further configured to: receive from a second client device a second request including a second value purporting to be a second particular value; and determine that the second value purporting to be the second particular value matches the second particular value.

In some embodiments, a computer storage medium having computer-executable instructions stored thereon that, when executed by one or more processors, cause the one or more processors to perform operations of transmitting a webpage comprising instructions for generating a particular value responsive to processing the webpage; receiving from a client device a request including a value purporting to be the particular value; determining that the value purporting to be the particular value matches the particular value; and responsive to the server determining that the value purporting to be the particular value matches the particular value, servicing, by the server, the request.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc. are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    transmitting, by a server to a client device, a webpage comprising instructions for executing a plurality of client-side calculations that generate a test value, wherein the instructions are embedded in a portion of code of the webpage and executable at rendering a portion of the webpage such that the generated test value is automatically updated as a side effect of rendering of a received webpage by the client device;

receiving, by the server from the client device, a request including the generated test value;

determining, by the server, that the generated test value matches an expected value; and responsive to the server determining that the generated test value matches the expected value, servicing, by the server, the request from the client device.

2. The method according to claim 1, wherein determining, by the server, that the generated test value matches the expected value further comprises:

generating, by the server, the expected value; and comparing, by the server, the generated test value to the expected value.

3. The method according to claim 1, wherein the instructions of the webpage instruct a browser of the client device to iteratively render portions of the webpage, and wherein servicing the request includes transmitting, by the server, an iterative portion of the webpage for rendering.

4. The method of claim 1, wherein the request indicates a line item object of the webpage according to a user input and servicing the request further comprises updating, by the server, the line item object from the webpage.

5. The method according to claim 1, wherein the instructions for generating the test value instruct the client device to generate the test value responsive to processing the webpage and based on a plurality of calls to the instructions for generating the test value.

6. The method according to claim 5, wherein for each call the test value is updated using the instructions for generating the test value.

7. The method of claim 1, further comprising:

receiving, by the server, a second request including a second test value purporting to be a next iteration of the plurality of client-side calculations, and a line item object for association with an ongoing browser session between the server and browser of the client device; and determining, by the server, a second expected value for comparing against the second test value.

8. The method of claim 7, further comprising associating, by the server, a second line item object with a browser session in response to the server determining that the second test value matches the second expected value.

9. The method of claim 7, further comprising disassociating, by the server, the line item object from a browser session in response to the server determining that the second test value fails to match to the second expected value.

10. A system comprising:

a non-transitory machine readable memory configured to store information a plurality of particular values; and a processor configured to:

transmit, to a client device, a webpage comprising instructions for executing a plurality of client-side calculations that generate a test value, wherein the instructions are embedded in a portion of code of the webpage and executable at rendering a portion of the webpage such that the generated test value is automatically updated as a side effect of rendering of a received webpage by the client device;

receive, from the client device, a request including the generated test value;

determine that the generated test value matches an expected value; and service the request from the client device, in response to the processor determining that the generated test value matches the expected value.

11. The system of claim 10, wherein when determining that the generated test value matches the expected value the processor is further configured to:

generate the expected value; and compare the generated test value to the expected value.

12. The system of claim 10, wherein the instructions of the webpage instruct a browser of the client device to iteratively render portions of the webpage; and wherein, when servicing the request, the processor is further configured to transmit an iterative portion of the webpage for rendering.

13. The system of claim 10, wherein the request indicates a line item object of the webpage according to a user input and when servicing the request, the processor is further configured to update the line item object from the webpage.

14. The system of claim 10, wherein the instructions for generating the test value instruct the client device to generate the test value responsive to processing the webpage and based on a plurality of calls to the instructions for generating the test value.

15. The system of claim 14, wherein for each call the test value is updated using the instructions for generating the test value.

16. The system of claim 10, wherein the processor is further configured to:

receive a second request including a second test value purporting to be a next iteration of the plurality of client-side calculations, and a line item object for association with an ongoing browser session between the processor and browser of the client device; and determine a second expected value for comparing against the second expected value.

17. The system of claim 16, the processor is further configured to associate a second line item object with a browser session in response to the processor determining that the second test value matches the second expected value.

18. The system of claim 16, the processor is further configured to disassociate the line item object from a browser session in response to the processor determining that the second test value fails to match to the second expected value.

19. A non-transitory computer storage medium having computer-executable instructions stored thereon that, when executed by one or more processors, cause the one or more processors to perform operations comprising:

transmitting, to a client device, a webpage comprising instructions for executing a plurality of client-side calculations that generate a test value, wherein the instructions are embedded in a portion of code of the webpage and executable at rendering a portion of the webpage such that the generated test value is automatically updated as a side effect of rendering of a received webpage by the client device;

receiving, from the client device, a request including the generated test value;

determining that the generated test value matches an expected value; and servicing the request from the client device, in response to determining that the generated test value matches the expected value.

* * * * *